United States Patent
Hu

(10) Patent No.: US 11,204,894 B2
(45) Date of Patent: *Dec. 21, 2021

(54) INFORMATION READ/WRITE METHOD AND APPARATUS BASED ON BLOCKCHAIN

(71) Applicant: ADVANCED NEW TECHNOLOGIES CO., LTD., Grand Cayman (KY)

(72) Inventor: Duofeng Hu, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 17/210,589

(22) Filed: Mar. 24, 2021

(65) Prior Publication Data

US 2021/0209061 A1 Jul. 8, 2021

Related U.S. Application Data

(63) Continuation of application No. 16/855,148, filed on Apr. 22, 2020, now Pat. No. 10,990,563, which is a
(Continued)

(30) Foreign Application Priority Data

Apr. 11, 2019 (CN) .......................... 201910290624.4

(51) Int. Cl.
*G06F 16/182* (2019.01)
*G06F 16/13* (2019.01)
(Continued)

(52) U.S. Cl.
CPC .......... *G06F 16/137* (2019.01); *G06F 16/144* (2019.01); *G06F 16/156* (2019.01); *G06F 16/182* (2019.01); *H04L 9/0637* (2013.01)

(58) Field of Classification Search
CPC .................................................... G06F 16/182
See application file for complete search history.

(56) References Cited

U.S. PATENT DOCUMENTS

| 7,013,290 B2 | 3/2006 | Ananian |
| 9,635,000 B1 | 4/2017 | Muftic |

(Continued)

FOREIGN PATENT DOCUMENTS

| CN | 108550037 A | 9/2018 |
| CN | 108806779 A | 11/2018 |

(Continued)

OTHER PUBLICATIONS

First Search for Chinese Application No. 201910290624.4 dated Apr. 1, 2020.
(Continued)

*Primary Examiner* — Hau H Hoang

(57) ABSTRACT

This specification provides an information read/write method and apparatus based on a blockchain. The information read/write method based on a blockchain includes: receiving a service request from a project member of a project, wherein the service request comprises a service file of the project member and file information of the service file; determining a storage key based on the service file; sending the storage key to an object storage server for permission verification; upon determining that the permission verification succeeded, sending the service file to the object storage server for storage; receiving a file storage identifier returned by the object storage server; generating a service identifier by compressing the file information of the service file; storing the service identifier and the file storage identifier into a blockchain; and obtaining a hash value that is returned from the blockchain.

19 Claims, 7 Drawing Sheets

Related U.S. Application Data continuation of application No. PCT/CN2020/071451, filed on Jan. 10, 2020.

(51) Int. Cl.
    *H04L 9/06*     (2006.01)
    *G06F 16/14*     (2019.01)

(56) References Cited

U.S. PATENT DOCUMENTS

| | | |
|---|---|---|
| 2016/0300234 A1 | 10/2016 | Moss-Pultz et al. |
| 2017/0046698 A1 | 2/2017 | Haldenby et al. |
| 2017/0193619 A1 | 7/2017 | Rollins et al. |
| 2017/0352027 A1 | 12/2017 | Zhang et al. |
| 2017/0358041 A1 | 12/2017 | Forbes, Jr. et al. |
| 2017/0372278 A1 | 12/2017 | Frolov et al. |
| 2018/0089971 A1 | 3/2018 | Campero et al. |
| 2018/0097635 A1 | 4/2018 | Moses |
| 2018/0129945 A1 | 5/2018 | Saxena et al. |
| 2018/0130034 A1 | 5/2018 | Taylor et al. |
| 2018/0196948 A1 | 7/2018 | Chen et al. |
| 2018/0205555 A1 | 7/2018 | Watanabe et al. |
| 2018/0216946 A1 | 8/2018 | Gueye |
| 2018/0225661 A1 | 8/2018 | Russinovich et al. |
| 2020/0110728 A1 | 4/2020 | Semenov et al. |
| 2020/0159696 A1 | 5/2020 | Adluri et al. |
| 2020/0160947 A1 | 5/2020 | Rasovsky et al. |

FOREIGN PATENT DOCUMENTS

| | | |
|---|---|---|
| CN | 108920966 A | 11/2018 |
| CN | 109308421 A | 2/2019 |
| CN | 109509108 A | 3/2019 |
| CN | 110009518 A | 7/2019 |

OTHER PUBLICATIONS

Written Opinion and International Search Report for PCT Application No. PCT/CN2020/071451 dated Apr. 8, 2020 and made available on public on Oct. 15, 2020.

INFORMATION READ/WRITE METHOD AND APPARATUS BASED ON BLOCKCHAIN

CROSS REFERENCE TO RELATED APPLICATIONS

The application is a continuation application of the U.S. patent application Ser. No. 16/855,148, filed on Apr. 22, 2020, and entitled "INFORMATION READ/WRITE METHOD AND APPARATUS BASED ON BLOCKCHAIN," which is a continuation application of International Patent Application No. PCT/CN2020/071451, filed on Jan. 10, 2020. The International Patent Application No. PCT/CN2020/071451 claims priority to Chinese Patent Application No. 201910290624.4, filed on Apr. 11, 2019. The entire contents of all of the above referenced applications are incorporated herein by reference.

TECHNICAL FIELD

This specification relates to the field of Internet technologies, and in particular, to an information read/write method based on a blockchain. The present specification also relates to an information read/write apparatus based on a blockchain, a computing device, and a computer readable storage medium.

BACKGROUND

With the development of the Internet-based insurance services, mutual insurance projects are launched on the market. In this insurance mode, an insured person may join in the insurance service after meeting an admission condition stipulated by the insurance mode. The insured person in the insurance mode may claim settlement if having an illness or an accident during the period of the insurance service. The indemnity may be shared among other insured persons. The fees may be deducted by the insurance service company or paid by other insured persons except the person who obtains the indemnity. This type of insurance is popular among users due to the advantages such as low premium, a large user base, and being fairer.

In the existing solutions, if claim settlement of a case occurs, large files such as medical file photos may need to be uploaded to a blockchain. A platform, a supervising party, and a mutual corporation may query the successfully uploaded information about the claim settlement of the case in the blockchain.

However, the size of uploaded information permitted by the blockchain each time is within 512 KB, and an upload frequency is controlled at second-level. Generally, information related to the claim settlement of a case is relatively large. As a result, uploading to the blockchain may fail, which greatly increases the processing time of the case.

SUMMARY

Accordingly, embodiments of this specification provide an information read/write method based on a blockchain. This specification also relates to an information read/write apparatus based on a blockchain, a computing device, and a computer readable storage medium, to resolve the technical defects in the existing solutions.

According to a first aspect of the embodiments of this specification, an information read/write method based on a blockchain is provided. The method may include: creating a storage space in an object storage server for storing files of a project; receiving from the object storage server a storage key corresponding to the created storage space; receiving a service request from a project member of a project, wherein the service request comprises a service file of the project member and file information of the service file; sending the storage key to an object storage server for permission verification; upon determining that the permission verification succeeded, sending the service file to the object storage server for storage; receiving a file storage identifier returned by the object storage server, wherein the file storage identifier corresponds to the service file stored at the object storage server; generating a service identifier by compressing the file information of the service file; storing the service identifier and the file storage identifier into a blockchain; and obtaining a hash value that is returned from the blockchain and that corresponds to successfully writing the service identifier and the file storage identifier into the blockchain.

In some embodiments, the creating the storage space in the object storage server comprises: sending a request to the object storage server to create the storage space.

In some embodiments, the service file comprises at least one of an image file, a video file, or a scanned file.

In some embodiments, storing the service identifier and the file storage identifier into the blockchain further comprises: writing the service identifier, the file storage identifier, and the storage key into the blockchain, wherein the storage key indicates whether the service file is allowed to be written into or retrieved from the object storage server.

In some embodiments, the method further comprises receiving a new hash value corresponding to a different service request; retrieving a new file storage identifier and a new storage key from the blockchain based on the new hash value; sending the new storage key to the object storage server for verification; and upon determining that the verification succeeded, retrieving a new service file based on the new file storage identifier from the object storage server.

In some embodiments, the method further comprises retrieving a new service identifier based on the new hash value; and processing the different service request based on the new service identifier and the retrieved new service file.

In some embodiments, the method further comprises decompressing the new service identifier to obtain new file information of the service file; and the processing the different service request comprises: processing the different service request based on the new file information and the retrieved new service file.

According to a second aspect of the embodiments of this specification, a system for information read/write based on a blockchain is provided. The system comprises one or more processors and one or more non-transitory computer-readable memories coupled to the one or more processors and configured with instructions executable by the one or more processors to cause the system to perform operations comprising: creating a storage space in an object storage server for storing files of a project; receiving from the object storage server a storage key corresponding to the created storage space; receiving a service request from a project member of a project, wherein the service request comprises a service file of the project member and file information of the service file; sending the storage key to an object storage server for permission verification; upon determining that the permission verification succeeded, sending the service file to the object storage server for storage; receiving a file storage identifier returned by the object storage server, wherein the file storage identifier corresponds to the service file stored at the object storage server; generating a service identifier by compressing the file information of the service file; storing the service identifier and the file storage identifier into a blockchain; and obtaining a hash value that is returned from the blockchain and that corresponds to successfully writing the service identifier and the file storage identifier into the blockchain.

According to a third aspect of the embodiments of this specification, a non-transitory computer-readable storage medium for information read/write based on a blockchain is provided. The storage medium is configured with instructions executable by one or more processors to cause the one or more processors to perform operations comprising: creating a storage space in an object storage server for storing files of a project; receiving from the object storage server a storage key corresponding to the created storage space; receiving a service request from a project member of a project, wherein the service request comprises a service file of the project member and file information of the service file; sending the storage key to an object storage server for permission verification; upon determining that the permission verification succeeded, sending the service file to the object storage server for storage; receiving a file storage identifier returned by the object storage server, wherein the file storage identifier corresponds to the service file stored at the object storage server; generating a service identifier by compressing the file information of the service file; storing the service identifier and the file storage identifier into a blockchain; and obtaining a hash value that is returned from the blockchain and that corresponds to successfully writing the service identifier and the file storage identifier into the blockchain.

According to the information read/write method based on a blockchain provided in this specification, a platform corresponding to a project that a project member participates in first receives a service request sent by the project member. The platform corresponding to the project stores a service file carried by the service request into an object storage server, and receives a file storage identifier returned by the object storage server, thereby ensuring the security of the service file of the project member. Moreover, the platform corresponding to the project writes service information and the file storage identifier into the blockchain to generate a unique hash value, so that information written into the blockchain may occupy a small storage space, the write speed and the success rate of writing into the blockchain may be improved.

DETAILED DESCRIPTION OF THE INVENTION

Figure 1:
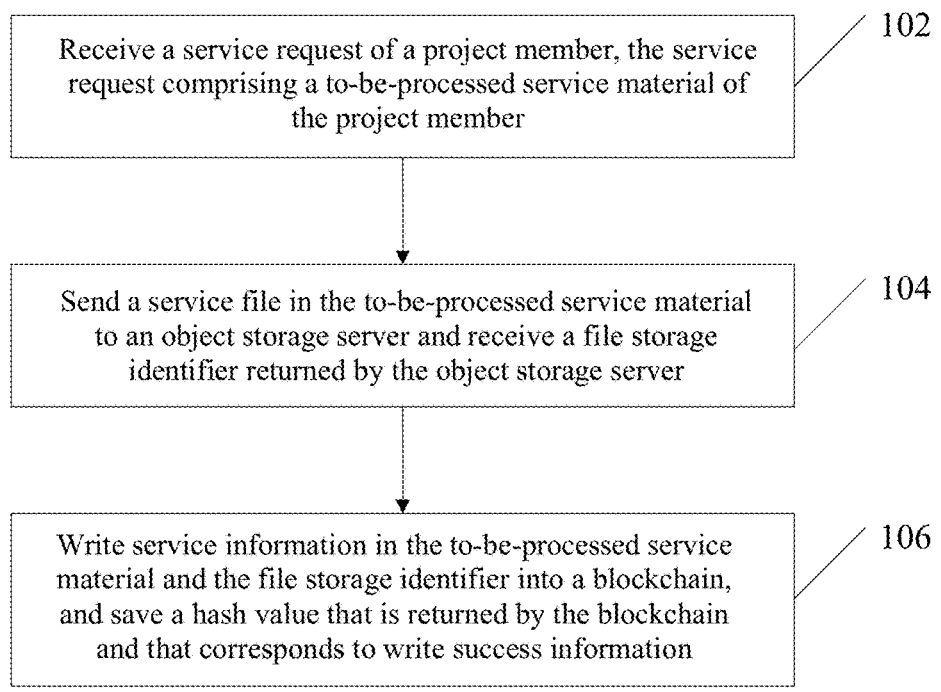
FIG. 1 is a flowchart of an information read/write method based on a blockchain according to one or more embodiments of this specification.

Many specific details are described below for a full understanding of the present specification. However, the present specification may be implemented in many other ways than those described herein, and those skilled in the art may make similar analogy without departing from the essence of the present specification. Therefore, the present specification is not limited by the specific implementation disclosed below.

The terms used in one or more embodiments of the present specification are merely used to describe the embodiments but are not intended to limit one or more embodiments of the present specification. The "a" and "the" in a singular form used in one or more embodiments of the present specification and the appended claims are also intended to include a plural form, unless other meanings are clearly indicated in the context. It should also be understood that, the term "and/or" used in one or more embodiments of the present specification indicates and includes any or all possible combinations of one or more associated listed items.

The terms "first," "second," and the like may be used to describe various information in one or more embodiments of the present specification, but such information should not be limited to these terms. These terms are merely used for distinguishing information of the same type from each other. For example, without departing from the scope of one or more embodiments of the present specification, the first may also be referred to as the second. Similarly, the second may also be referred to as the first. Depending on the context, the term "if" as used herein may be interpreted as "when . . . " or "upon . . . " or "in response to determining."

Mutual insurance can be considered an insurance activity where organizations or individuals having homogeneous risk insurance needs may become members through contract, and pay insurance premiums to form a mutual fund; the fund may undertake liability for damage caused by accidents specified in the contract, or undertakes the responsibility to pay the insurance benefit in the cases of death, permanent disability, illness of an insured person or when the insured person reaches the age specified in the contract or meets other conditions such as a period specified in the contract.

Blockchain is a new application mode of computer technologies such as distributed data storage, point-to-point transmission, a consensus mechanism, and an encryption algorithm. One type of blockchain is a consortium blockchain. In a consortium blockchain, preselected nodes are defined as validators, and generation of each new node is jointly decided by all the preselected nodes. Any other company and organization may access the blockchain in a restricted way through open APIs of the blockchain. One feature of the consortium blockchain is that each node corresponds to one entity institution, and any entity institution node that intends to join the consortium blockchain needs to obtain the permission of the existing institutions in the consortium blockchain. These institutions may jointly maintain the stable development of the consortium blockchain.

A hash function (or known as a hash algorithm) is a method for creating a small digital "fingerprint" from any data. The hash function compresses a message or data into a digest, so that a data amount is reduced, and a data format is fixed.

Object storage service (OSS) is a cloud storage service that provides mass secure storage with low costs and high reliability. Data may be uploaded and downloaded in any application, at any time, and at any place by invoking an application programming interface (API). Simple management may be carried out on the data through a Web (World Wide Web) console. The OSS is suitable for storing files of any type, and is suitable to be used by various websites, development enterprises and developers.

In the present specification, an information read/write method based on a blockchain is provided. This specification also relates to an information read/write apparatus based on a blockchain, a computing device, and a computer readable storage medium, which are described in detail in the following embodiments.

FIG. 1 is a flowchart of an information read/write method based on a blockchain according to an embodiment of this specification. The method is applied to a first service server and includes step 102 to step 106.

Step 102: Receive a service request from a project member, the service request comprising a to-be-processed service material of the project member.

The project member in the embodiment of this specification may be a project member participating in a mutual aid fund, a project member participating in a poverty relief project, or a project member in a share project. Herein, the mutual aid project is used as an example to describe the information read/write method based on a blockchain.

For example, the mutual aid project means that project members having the same requirement help each other by participating in the mutual aid project. It may be interpreted as follows: when a project member participating in the mutual aid project has an accident or needs aid, as long as the accident that occurs on the project member or the aid needed by the project member is within a service scope of the mutual aid project, other members participating in the mutual aid project may provide a certain amount of mutual aid money or certain aid to the project member.

In one embodiment, when a project member has an accident or a case that needs aid when participating in the mutual aid project, the project member submits a mutual aid request to a platform of the mutual aid project. When the mutual aid request is submitted, the platform of the mutual aid project needs to upload event information (e.g., the project member has an accident or needs aid and attribute information of the project member) to the blockchain, and a mutual aid company determines case information of the project member. At the same time, a supervising party monitors this process. If the mutual aid company determines that the case information is not modified, the mutual aid platform matches the case with a project review member to review the case. It is reviewed whether the case meets mutual aid requirements stipulated by the mutual aid project. If the requirements are met, mutual aid is provided for the project member of this case; if the requirements are not met, mutual aid for the project member of the case is rejected.

When a project member has a to-be-processed service, to avoid the possibility of tampering service information and a service file of the to-be-processed service, the service information and the service file of the project member are uploaded to the blockchain. Moreover, multiple supervising parties may be set for supervision, to ensure that the processing procedure of the whole case is open and transparent. In addition, to ensure successful uploading, the service file of the project member may be stored in an object storage server and an index file storage identifier corresponding to the service file may be generated. Only the file storage identifier and the service information may need to be written into the blockchain, which may generate a corresponding hash value. When the to-be-processed service of the project member is processed, the service information and the service file of the project member may be obtained by querying the corresponding service information and file storage identifier in the blockchain according to the hash value. In this way, the transparency of the information may be ensured, and the success rate of uploading to the blockchain may be improved.

In some embodiments, the to-be-processed service material of the project member carried in the service request may be a material required by the to-be-processed service. For example, in a mutual aid project, the material may be identity information of the project member, to-be-processed service information, medical disease information, medical file photo certificates, and the like. As another example, in a share project, the material may be identity information of the project member, shared item information, shared item photo certificates, and the like. The specific to-be-processed service material may be a corresponding service material received according to an actual application service, and is not limited in this specification.

In some embodiments, after the service request of the project member is received, a type of a to-be-processed service may further be determined according to the service request.

After the type of the to-be-processed service is determined, the subsequent step of sending the service file to an object storage server corresponding to the type of the to-be-processed service, and receiving the file storage identifier returned by the object storage server may be performed.

In one embodiment, to-be-processed services may have various types, such as a to-be-processed service in a mutual aid project, or a to-be-processed service in a share project. The to-be-processed service in the mutual aid project may be a mutual aid service request sent to a platform corresponding to the mutual aid project by a project member who has an accident or needs aid in the mutual aid project; the to-be-processed service in the share project may be a share service request sent to the platform corresponding to the share project by a project member who needs to share a certain item.

In the following description, the mutual aid project is used as an example to describe the foregoing steps of receiving the service request of the project member and determining the type of the to-be-processed service. A project member A participates in the mutual aid project. During the participation period, the project member A has a car accident and needs mutual aid. The platform corresponding to the mutual aid project receives a mutual aid request sent by the project member A, and determines, according to a to-be-processed mutual aid material of the project member A in the mutual aid request, that a type corresponding to the project member A is an accident. According to the type corresponding to the project member A, a service file in the to-be-processed mutual aid material of the project member A may further be sent to the object storage server.

By receiving the service request of the project member and determining the type of the to-be-processed service of the project member according to the to-be-processed service material of the project member carried in the service request, the service platform may conveniently carry out subsequent service processing on the to-be-processed service material of the project member.

In some embodiments, after the service request of the project member is received, a storage space for storing the service file may need to be created in the object storage server. A specific implementation may be as follows: creating a storage space in the object storage server; and receiving a storage key that is returned by the object server and that corresponds to the storage space.

For example, before the service file in the to-be-processed service material is stored, a storage space needs to be created in the object storage server. The storage space is used for storing a service file related to a project that the project member participates in, and the storage space further corresponds to storage key. The storage key is only owned by a platform corresponding to the project that the project member participates in, thereby ensuring the security of the service file of the project member.

In addition, the object storage server may further store other files of the project that the project member participates in. The permission to create multiple storage spaces in the object storage server may be obtained in the platform corresponding to the project. In a case that the permission is obtained, multiple storage spaces that need to be applied are created in the object storage server; the object storage server generates corresponding storage keys according to the storage spaces and sends the storage keys to the platform corresponding to the project.

In some embodiments, based on the foregoing steps of creating a storage space in the object storage server, and receiving a storage key that is returned by the object server and that corresponds to the storage space, verification may be performed before the service file is stored in the object storage server. An exemplary implementation of the verification is as follows: sending the storage key to the object storage server for verification; and performing the following step 104 in a case that the verification succeeds.

In a case that the verification fails, it indicates that the storage key may have no corresponding storage space in the object storage server. A new storage space may be created in the object storage server, and a new storage key is obtained, or another storage key is selected. Then, the newly obtained storage key is sent to the object storage server for verification.

For example, the object storage server owns 4 storage spaces, which correspond to a storage key 1, a storage key 2, a storage key 3, and a storage key 4 respectively. Besides, the platform corresponding to a project that the project member participates in owns the storage key 4. After receiving the service request sent by the project member, according to the service file in the service request, the platform corresponding to the project stores the service file into the storage space that is in the object storage server and that corresponds to the storage key 4. The storage key 4 is sent to the object storage server for verification. In a case that the verification succeeds, the service file may be successfully stored into the storage space that is in the object storage server and that corresponds to the storage key 4.

In addition, the object storage server may store large service files, for example, photo files, video files or medical file photos related to the to-be-processed service of the project member, and other service files.

By creating the storage space in the object storage server and receiving the storage key returned by the object storage server, large service files of the project member may be stored into the storage space corresponding to the storage key owned by the project platform, thereby ensuring the security of the service file of the project member. Moreover, some large service files may be stored.

In some embodiments, after the step of receiving a service request from a project member, the project member may need to be authenticated to determine whether the service is requested by the project member. An exemplary authentication is implemented as follows: obtaining identification information of the project member; authenticating the project member according to the identification information; and performing the following step 104 in a case that the authentication of the project member succeeds.

In a case that the authentication of the project member fails, it indicates that identity information of the project member is inconsistent with identity information of the project member that submits the service request, and the platform corresponding to the project member may reject to process the service of the project member that submits the service request.

Specifically, the identification information may be an ID card number of the project member or a password set by the project member.

In one embodiment, the identification information of the project member may be obtained by performing face recognition on the project member by using a mobile phone terminal of the project member or asking the project member to enter a password in an application program corresponding to the project platform on the mobile phone terminal. The process of authenticating the project member may be set according to an application scenario, and is not limited in this specification.

In some embodiments, by receiving the service request of the project member and determining the type of the to-be-processed service of the project member according to the to-be-processed service material carried in the service request, the platform corresponding to the project that the project member participates in may conveniently store the to-be-processed service. Moreover, the storage space for storing the service file is created in the object storage server, thereby ensuring the security of the service file of the project member. In addition, before the service request of the project member is received, the project member is authenticated, thereby avoiding the possibility that the project member deceives the platform corresponding to the project.

Step 104: Send a service file in the to-be-processed service material to an object storage server and receive a file storage identifier returned by the object storage server.

For example, in a case that the project member passes the authentication, the service request of the project member is received, the service file in the to-be-processed service material carried in the service request is stored into the object storage server, and a storage identifier for storing the service file returned by the object storage server is received.

In some embodiments, when the service file in the to-be-processed service material is to be sent to the object storage server, the service file may be sent to the corresponding storage space of the object storage server, and the file storage identifier returned by the object storage server may be received.

In some embodiments, the service file is sent to the corresponding storage space in the object storage server, and the file storage identifier returned by the object storage server is received. Based on this, the service file may further be sent to the storage space corresponding to the type of the to-be-processed service, and the file storage identifier returned by the object storage server may be received.

In one embodiment, the platform corresponding to the project that the project member participates in may create a storage space in the object storage server according to a requirement. The storage space may be used for storing the service file of the project member, and the storage space may correspond to a storage key. The storage key may be saved in the platform corresponding to the project, thereby ensuring the security of the service file. Moreover, after the service file is stored into the storage space in the object storage server, the object storage server may generate a file storage identifier according to content of the stored service file. The file storage identifier may be unique. When the service file of the project member is looked up subsequently, the corresponding service file may be obtained in the object storage server according to the file storage identifier. For example, the file storage identifier may be an index ID or a timestamp comprising service information. The specific file storage identifier may be set according to an actual application scenario, and is not limited in this specification.

In the following description, a project member B participating in a mutual aid project may be used as an example to describe the step of sending a service file in the to-be-processed service material to an object storage server and receiving a file storage identifier returned by the object storage server. The project member B has a mutual aid case. The project member B sends a service file required for the mutual aid case to a mutual aid platform. The service file includes information about the mutual aid case of the project member B, certificate information required for processing the mutual aid service, and the like. The mutual aid platform sends the received service file to an object storage server. The object storage server stores the service file of the project member B into a corresponding storage space, and generates an index ID matching the service file of the project member B. The object storage server sends the index ID to the mutual aid project platform.

In some embodiments, by sending a service file of the to-be-processed service material to the object storage server for storage, the security of the service file may be ensured. Moreover, the object storage server returns, according to the stored service file, the file storage identifier to the platform corresponding to the project that the project member participates in, thereby ensuring that in the subsequent service processing procedure, the service file may be quickly extracted from the object storage server according to the file storage identifier, thereby accelerating the service processing.

Step 106: Write service information in the to-be-processed service material and the file storage identifier into the blockchain, and save a hash value that is returned by the blockchain and that corresponds to write success information.

In one embodiment, the service file is sent to the object storage server for storage, and the file storage identifier for storage of the service file is received. After the file storage identifier is received, the service information in the to-be-processed material and the file storage identifier may need to be written into the blockchain, and the hash value returned by the blockchain may be saved. By writing the file storage identifier into the blockchain, a size of the file written into the blockchain may be reduced, a write speed may be increased, and a success rate of uploading to the blockchain may be improved. Moreover, the hash value corresponding to the service information and the file storage identifier may be generated, thereby avoiding the possibility of tampering with the service information and the service file that corresponds to the file storage identifier.

In one embodiment, the service information may be file information in the service file. For example, if the service file stores a certificate photo of an ID card, the corresponding service information may be the information provided by the certificate photo of the ID card. In addition, the service information may also be information of the to-be-processed service of the project member, medical information of the project member, and the like.

In one embodiment, when the service information and the file storage identifier are written into the blockchain, a unique hash value may be generated. If the service information is tampered, the unique hash value may change, and in the subsequent service processing procedure, the service information of the project member cannot be obtained by using the original unique hash value.

In some embodiments, the service information and the file storage identifier may also be written into the blockchain in another manner, and an exemplary implementation may be as follows: writing the service information and the file storage identifier into the blockchain according to a preset storage mode of the blockchain, and saving the hash value that is returned by the blockchain and that corresponds to the write success information.

Specifically, the preset storage mode may be writing the service information and the file storage identifier into the blockchain in a table form, or may be writing the service information and the file storage identifier into the blockchain in a text form. The specific storage mode may be set according to actual application, and is not limited in this specification.

In some embodiments, in a case where the amount of the service information is large, the service information may further be processed. An exemplary processing procedure is as follows: generating a service identifier based on the service information; and writing the service identifier and the file storage identifier into the blockchain, and saving the hash value that is returned by the blockchain and that corresponds to the write success information.

In one embodiment, the service identifier is unique. The service identifier may be an index ID or an identifier comprising a timestamp. A specific form of the service identifier may be set according to actual application.

When the service information is processed to generate the service identifier, the service information may be compressed so that it occupies a smaller storage space. Accordingly, a service identifier corresponding to the compressed service information may be generated. Then, only the service identifier comprising the compressed service information and the file storage identifier may need to be written into the blockchain, and a hash value returned by the blockchain may be received. In the subsequent service processing procedure, the corresponding service identifier and the file storage identifier may be queried in the blockchain according to the hash value. The compressed service information carried in the service identifier may be decompressed to obtain the service information, and then subsequent service analysis processing is performed.

In some embodiments, the service identifier and the file storage identifier are stored into the blockchain according to the preset storage mode of the blockchain, and the hash value that is returned by the blockchain and that corresponds to the write success information are saved, thereby improving the success rate of writing into the blockchain. Moreover, write into the blockchain is performed according to the present storage mode, thereby improving the write speed.

In the following description, a mutual insurance is used as an example to describe the step of writing service information in the to-be-processed service material and the file storage identifier into the blockchain, and saving a hash value that is returned by the blockchain and that corresponds to write success information. A project member participating in the mutual insurance sends claim information to a mutual insurance platform. The mutual insurance platform stores a claim file provided by the project member in an object storage server, and receives a file storage identifier returned by the object storage server. The mutual insurance platform compresses the claim information to obtain a claim identifier, and writes the claim identifier and the file storage identifier into the blockchain in a text form. The mutual insurance platform obtains a hash value corresponding to successful write.

In some embodiments, a platform corresponding to a project that a project member participates in may receive a service request sent by the project member. The platform corresponding to the project may store a service file carried by the service request into an object storage server, and receive a file storage identifier returned by the object storage server, thereby ensuring the security of the service file of the project member. Moreover, the platform corresponding to the project may write service information and the file storage identifier into the blockchain to generate a unique hash value, so that information written into the blockchain may occupy a small space with a fast write speed, and a success rate of writing into the blockchain may be improved. By combining the features of openness and transparency of the blockchain and the security feature of the object storage server, a success rate of writing into the blockchain may be improved, and the security of the information of the project member may be ensured.

Figure 2:
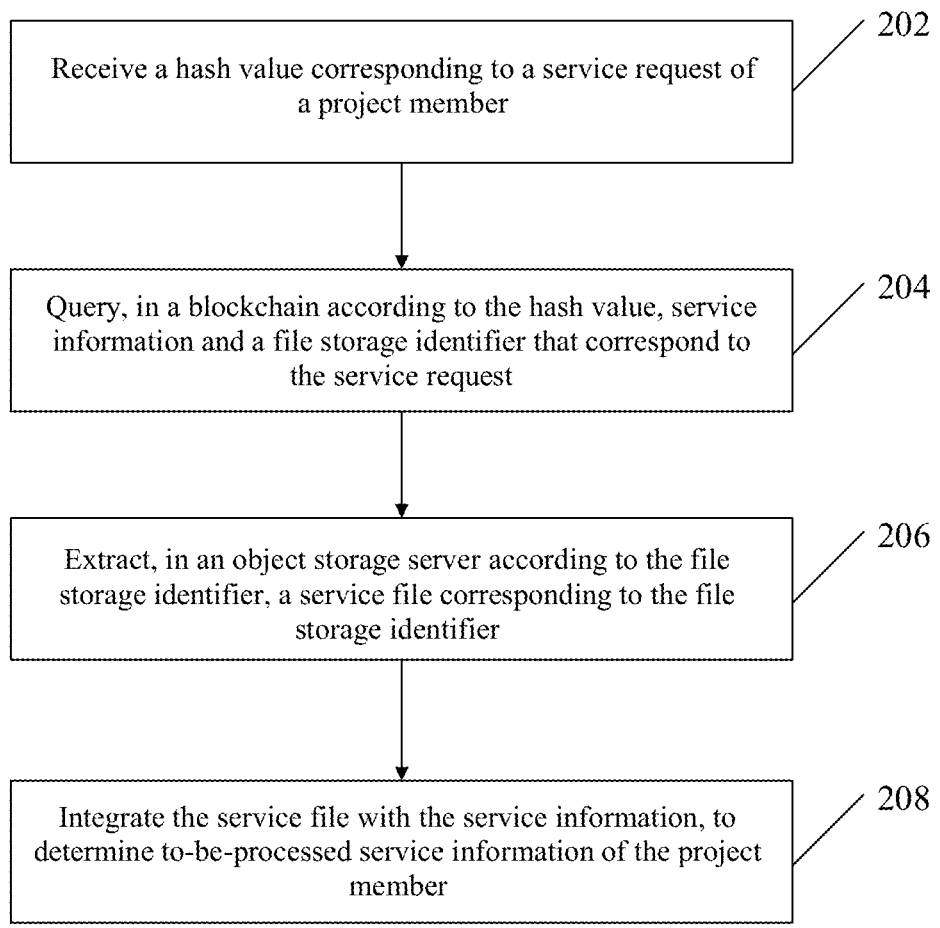
FIG. 2 is a flowchart of an information read/write method based on a blockchain according to one or more embodiments of this specification.

FIG. 2 shows an application of an information read/write method based on a blockchain according to an embodiment of this specification in a consortium blockchain. The method is applied to a second service server. The second service server may be a supervising party in the consortium blockchain or a managing party corresponding to a project that a project member participates in. The specific service processing procedures of the supervising party and the managing party may both be implemented through the following steps. The exemplary steps may include step 202 to step 208.

In some embodiments, the consortium blockchain may include a platform corresponding to the project that the project member participates in, the managing party corresponding to the project that the project member participates in, and at least one supervising party.

Step 202: Receive a hash value corresponding to a service request from a project member.

For example, in a case that the supervising party needs to supervise a to-be-processed service of the project member or the managing party needs to process the to-be-processed service, a hash value corresponding to successful write into the blockchain performed by the first service server may be received.

Step 204: Query, in the blockchain according to the hash value, service information and a file storage identifier that correspond to the service request.

For example, the hash value corresponding to the successful write into the blockchain performed by the first service server may be used to query the service information and the file storage identifier that correspond to the service request of the project member in the blockchain.

An exemplary process of querying the service information and the file storage identifier in the blockchain is as follows: querying a service identifier and the file storage identifier in the blockchain according to the hash value; and determining, based on the service identifier, the service information corresponding to the service request.

The specific description content of the service identifier and the file storage identifier may be determined according to the description in the foregoing embodiment, and details are not described again in this specification.

In some embodiments, before the service file and the file storage identifier are extracted, the supervising party or the managing party may further need to determine a storage key of an object storage server. The obtaining permission may only be obtained by using the storage key. An exemplary implementation is as follows: querying a storage key of the object server in the blockchain according to the hash value; and sending, to the object server according to the storage key, an obtaining request for obtaining the service file in a storage space corresponding to the storage key.

In the following description, a second service server is used as an example to describe the step of querying, in the blockchain according to the hash value, service information and a file storage identifier that correspond to the service request. A project member participates in a mutual aid project, and the managing party is a provider of mutual aid fund in the mutual aid project. After the process performed by a platform corresponding to the mutual aid project, a unique hash value is generated. The managing party queries, in the blockchain according to the hash value, mutual aid service information of the project member and a file storage identifier of a mutual aid service file, and may determine, according to the hash value, whether the mutual aid service information has changed.

In some embodiments, by obtaining the storage key in the blockchain, it is determined that the service file of the project member has been encrypted, thereby ensuring the security of the service file of the project member. In some embodiments, the storage key was written into the blockchain along with the service information and the file storage identifier, which are retrievable based on the hash value returned from the blockchain.

Step 206: Extract, in an object storage server according to the file storage identifier, a service file corresponding to the file storage identifier.

Specifically, the file storage identifier is found in the blockchain, and according to the file storage identifier, the service file corresponding to the file storage identifier may be extracted from the object storage server. For the description of the service file, reference may be made to the description in the foregoing embodiment, and details are not described again in this specification.

In some embodiments, due to the security feature of the object storage server, when a file needs to be extracted from the object storage server, a storage key needs to be provided. An exemplary process is as follows: obtaining, according to the file storage identifier, the service file in the storage space that is in the object storage server and that corresponds to the storage key.

In the following description, the second service server being a supervising party is used as an example to describe the step of obtaining, in an object storage server according to the file storage identifier, a service file corresponding to the file storage identifier. The supervising party needs to monitor the to-be-processed service of the project member, determines the file storage identifier and the storage key according to the hash value found in the blockchain, sends the storage key to the object storage server to obtain a file obtaining permission, and obtains, according to the file storage identifier, the service file that is in the object storage server and that corresponds to the file storage identifier.

Step 208: Integrate the service file with the service information, to determine to-be-processed service information of the project member.

Specifically, the obtained service information is integrated with the service file. The integration may be manual integration. Specific content of the to-be-processed service information of the project member may be known according to the service information and the service file, and the supervising party or the managing party may perform the subsequent procedure according to the to-be-processed service information.

In some embodiments, the subsequent processing procedure may be as follows: determining whether the to-be-processed service information is in a service scope; if yes, matching a to-be-processed service of the project member with a project review group; receiving a review result that is obtained after the project review group reviews the to-be-processed service; and if no, refusing to handle the to-be-processed service of the project member, and notifying the project member of a final information result.

In one embodiment, the supervising party and the managing party may know the specific content of the to-be-processed service of the project member according to the to-be-processed service information, and also determine, according to the known content, whether to-be-processed service of the project member is in the service scope. If the to-be-processed service is in the service scope, the managing party may perform the subsequent review process. The supervising party monitors the managing party. If the to-be-processed service is not in the service scope, the managing party refuses to handle the service, and the supervising party does not monitor the to-be-processed service of the project member.

In some embodiments, by querying the service information and the file storage identifier in the blockchain according to the hash value, it may be verified whether the service information and the service file corresponding to the file storage identifier are tampered, thereby ensuring the interest of each party, improving the service processing efficiency, also ensuring that content included in the to-be-processed service information of the project member is consistent with content included in the to-be-processed material when the service request is submitted, and improving the experience effect of the project member.

Figure 3:
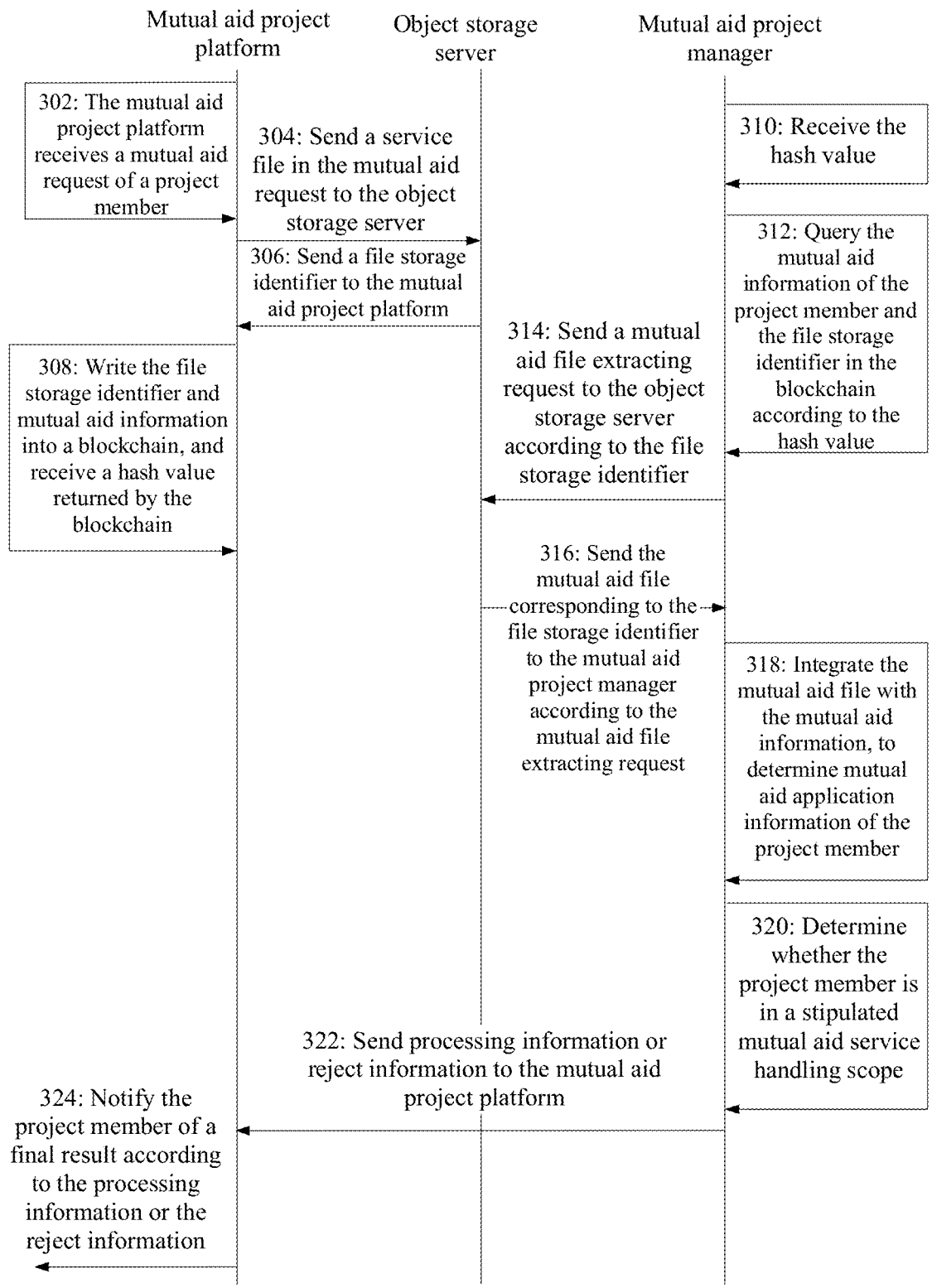
FIG. 3 is an interaction schematic diagram of an information read/write method based on a blockchain according to one or more embodiments of this specification.

In the following, with reference to FIG. 3 and FIG. 4, the information read/write method based on a blockchain provided in this specification is further described by using an example in which the information read/write method based on a blockchain is an entity in a consortium blockchain in a mutual aid project platform. Specific steps include step 302 to step 324.

Step 302: The mutual aid project platform receives a mutual aid request from a project member.

Figure 4:
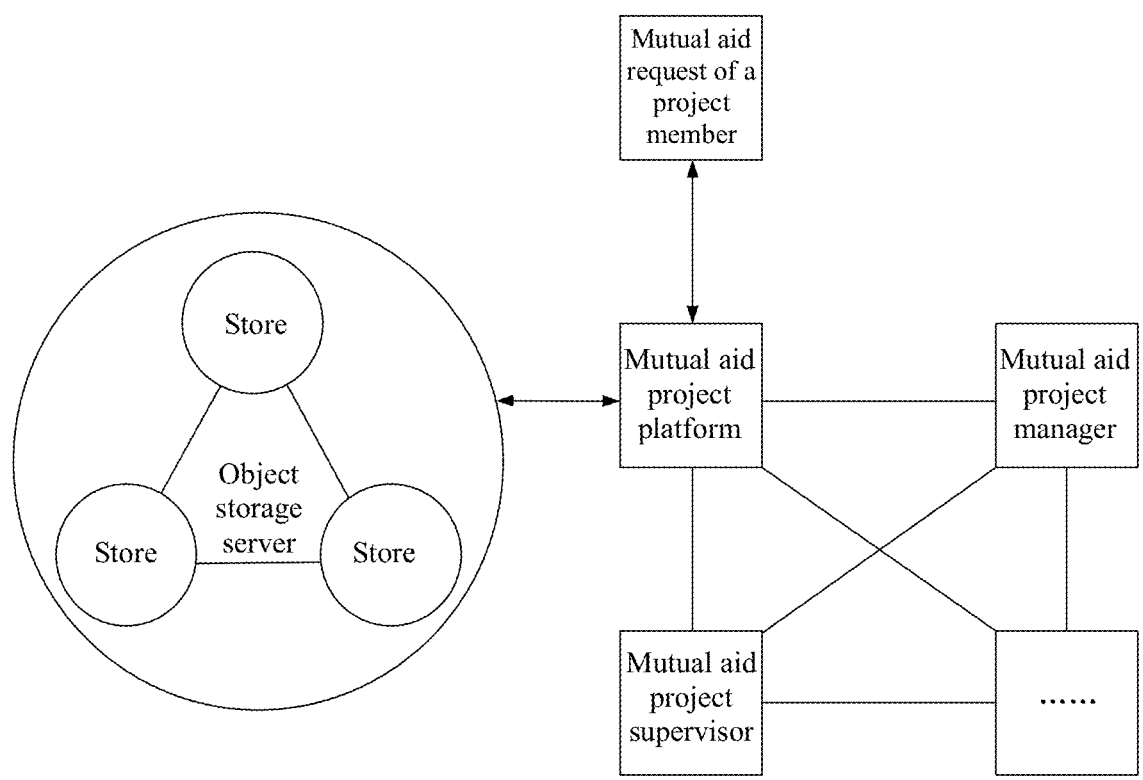
FIG. 4 is a schematic diagram of an information read/write method based on a blockchain according to one or more embodiments of this specification.

Referring to FIG. 4, the consortium blockchain includes a mutual aid project platform, a mutual aid project managing party, and at least one mutual aid project supervising party. Nodes in the consortium blockchain and an object storage server are used for storing mutual aid files sent by the mutual aid project platform.

Specifically, the project member participating in the mutual aid project submits a mutual aid request to the mutual aid project platform. The mutual aid request carries mutual aid information and a service file required by the mutual aid platform.

Step 304: The mutual aid project platform sends the service file in the mutual aid request to the object storage server.

Step 306: The object storage server generates a corresponding file storage identifier according to the service file, and sends the file storage identifier to the mutual aid project platform.

Step 308: The mutual aid project platform writes the file storage identifier and mutual aid information into the blockchain, and receives a hash value returned by the blockchain.

Step 310: The mutual aid project managing party receives the hash value.

Step 312: The mutual aid project managing party queries the mutual aid information of the project member and the file storage identifier in the blockchain according to the hash value.

Step 314: The mutual aid project managing party sends a service file obtaining request to the object storage server according to the file storage identifier.

Step 316: The object storage server sends the service file corresponding to the file storage identifier to the mutual aid project managing party according to the mutual aid file obtaining request.

Step 318: The mutual aid project managing party integrates the service file with the mutual aid information, to determine mutual aid application information of the project member.

Step 320: The mutual aid project managing party determines, according to the mutual aid information, whether the project member is in a stipulated mutual aid service scope.

Specifically, if the mutual aid application information of the project member is in the corresponding mutual aid service scope, the mutual aid service of the project member is processed subsequently, and processing information is sent to the mutual aid project platform. If the mutual aid application information of the project member is not in the corresponding mutual aid service scope, the mutual aid service of the project member is rejected, and reject information is sent to the mutual aid project platform.

Step 322: The mutual aid project managing party sends processing information or reject information to the mutual aid project platform.

Step 324: The mutual aid project platform notifies the project member of a final result according to the processing information or the reject information.

In some embodiments, the mutual aid project platform stores the mutual aid file carried by the mutual aid processing request into the object storage server, and receives the file storage identifier returned by the object storage server, thereby ensuring the security of the mutual aid file of the project member. In addition, the mutual aid project platform writes the mutual aid information and the file storage identifier into the blockchain to generate a unique hash value, so that the information written into the blockchain occupies a small space, a write speed is fast, and a success rate of writing into the blockchain is improved. By combining the features of openness and transparency of the blockchain and the security feature of the object storage server, the success rate of writing into the blockchain is improved, and the security of the information of the project member is ensured.

Figure 5:
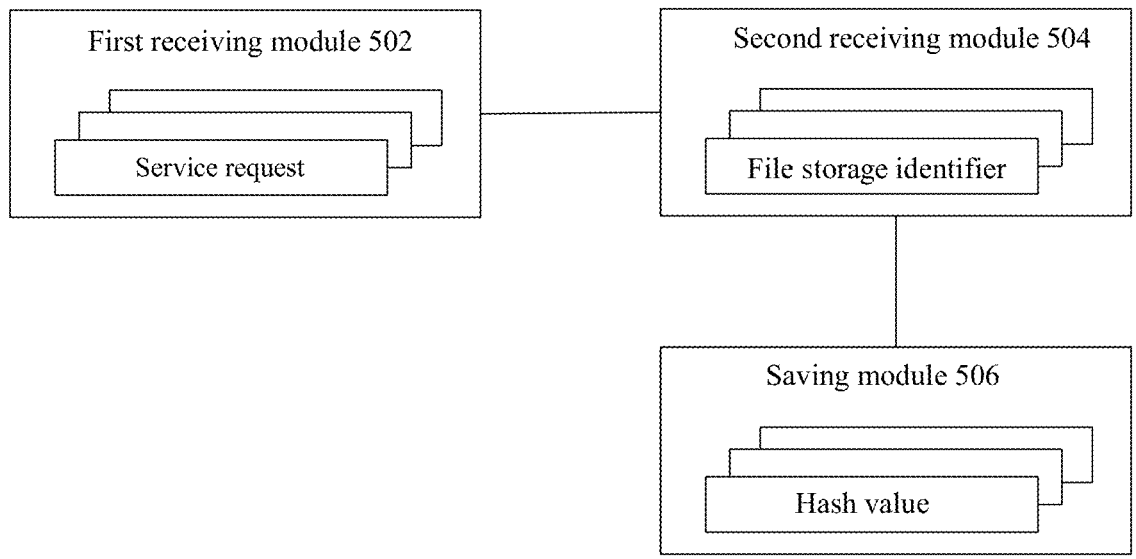
FIG. 5 is a schematic structural diagram of an information read/write apparatus based on a blockchain according to one or more embodiments of this specification.

Corresponding to the foregoing method embodiment, this specification further provides an embodiment of an information read/write apparatus based on a blockchain, which is applied to a first service server. FIG. 5 is a schematic structural diagram of an information read/write apparatus based on a blockchain according to an embodiment of this specification. As shown in FIG. 5, the apparatus includes: a first receiving module 502, configured to receive a service request from a project member, the service request comprising a to-be-processed service material of the project member; a second receiving module 504, configured to send a service file in the to-be-processed service material to an object storage server and receive a file storage identifier returned by the object storage server; and a saving module 506, configured to write service information in the to-be-processed service material and the file storage identifier into the blockchain, and save a hash value that is returned by the blockchain and that corresponds to write success information.

In an embodiment, the information read/write apparatus based on a blockchain may further include: a determining module, configured to determine a type of a to-be-processed service according to the service request; and correspondingly, the second receiving module 504 may be further configured to: send the service file to an object storage server corresponding to the type of the to-be-processed service, and receive the file storage identifier returned by the object storage server.

In an embodiment, the information read/write apparatus based on a blockchain may further include: a creating module, configured to create a storage space in the object storage server; and a third receiving module, configured to receive a storage key that is returned by the object server and that corresponds to the storage space.

In an embodiment, the information read/write apparatus based on a blockchain may further include: a verification module, configured to send the storage key to the object storage server for verification.

The second receiving module 504 runs when the verification succeeds.

In an embodiment, the second receiving module 504 may be further configured to send the service file to the storage space corresponding to the object storage server, and receive the file storage identifier returned by the object storage server.

In an embodiment, the second receiving module 504 may be further configured to send the service file to the storage space corresponding to the type of the to-be-processed service, and receive the file storage identifier returned by the object storage server.

In an embodiment, the information read/write apparatus based on a blockchain may further include: an obtaining module, configured to obtain identification information of the project member; and an authentication module, configured to authenticate the project member according to the identification information.

The second receiving module 504 runs when the authentication of the project member succeeds.

In an embodiment, the writing service information in the to-be-processed service material and the file storage identifier into the blockchain, and saving a hash value that is returned by the blockchain and that corresponds to write success information may include: writing the service information and the file storage identifier into the blockchain according to a preset storage mode of the blockchain, and saving the hash value that is returned by the blockchain and that corresponds to the write success information.

In an embodiment, the saving module 506 may include: a generating unit, configured to process the service information to generate a service identifier; and a saving unit, configured to write the service identifier and the file storage identifier into the blockchain, and save the hash value that is returned by the blockchain and that corresponds to the write success information.

In an embodiment, the saving module 506 may be further configured to: write the service identifier and the file storage identifier into the blockchain according to the preset storage mode of the blockchain, and save the hash value that is returned by the blockchain and that corresponds to the write success information.

In an embodiment, a platform corresponding to a project that a project member participates in first may receive a service request sent by the project member. The platform corresponding to the project may store a service file carried by the service request into an object storage server, and receive a file storage identifier returned by the object storage server, thereby ensuring the security of the service file of the project member. Moreover, the platform corresponding to the project may write service information and the file storage identifier into the blockchain to generate a unique hash value, so that information written into the blockchain occupies a small space, a write speed is fast, and a success rate of writing into the blockchain is improved. By combining the features of openness and transparency of the blockchain and the security feature of the object storage server, a success rate of writing into the blockchain is improved, and the security of the information of the project member is ensured.

Figure 6:
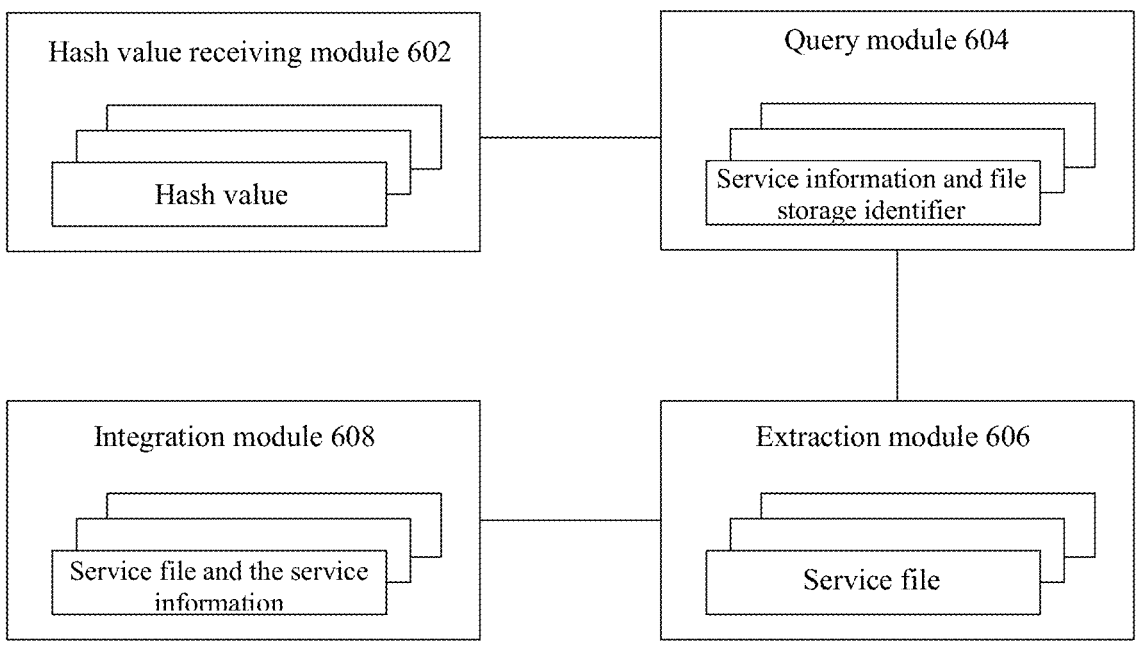
FIG. 6 is a schematic structural diagram of an information read/write apparatus based on a blockchain according to one or more embodiments of this specification.

Corresponding to the foregoing method embodiment, this specification further provides an embodiment of an information read/write apparatus based on a blockchain, which is applied to a second service server. FIG. 6 is a schematic structural diagram of an information read/write apparatus based on a blockchain according to an embodiment of this specification. As shown in FIG. 6, the apparatus includes: a hash value receiving module 602, configured to receive a hash value corresponding to a service request from a project member; a query module 604, configured to query, in the blockchain according to the hash value, service information and a file storage identifier that correspond to the service request; an obtaining module 606, configured to extract, in an object storage server according to the file storage identifier, a service file corresponding to the file storage identifier; and an integration module 608, configured to integrate the service file with the service information, to determine to-be-processed service information of the project member.

In an embodiment, the query module 604 may include: a query unit, configured to query a service identifier and the file storage identifier in the blockchain according to the hash value; and a determining unit, configured to determine, based on the service identifier, the service information corresponding to the service request.

In an embodiment, the information read/write apparatus based on a blockchain may further include: a key query module, configured to query a storage key of the object server in the blockchain according to the hash value; and a sending module, configured to send, to the object server according to the storage key, an obtaining request for obtaining the service file in a storage space corresponding to the storage key.

In an embodiment, the obtaining module 606 may be further configured to: extract, according to the file storage identifier, the service file in the storage space that is in the object storage server and that corresponds to the storage key.

In an embodiment, the information read/write apparatus based on a blockchain may further include: a detection module, configured to detect whether the to-be-processed service information is in a service scope; a matching module, configured to match a to-be-processed service of the project member with a project review group if the to-be-processed service information is in the service scope; and a review result receiving module, configured to receive a review result that is obtained after a project review group member in the project review group reviews the to-be-processed service.

In an embodiment, by querying the service information and the file storage identifier in the blockchain according to the hash value, it may be verified whether the service information and the service file corresponding to the file storage identifier are tampered, thereby ensuring the interest of each party, improving the service processing efficiency, also ensuring that content included in the to-be-processed service information of the project member is consistent with content included in the to-be-processed material when the service request is submitted, and improving the experience effect of the project member.

Described above is a schematic solution of an information read/write apparatus based on a blockchain according to this embodiment. The technical solution of the information read/write apparatus based on a blockchain belongs to the same conception as the technical solution of the foregoing information read/write method based on a blockchain. For content not described in detail in the technical solution of the information read/write apparatus based on a blockchain, reference may be made to the description of the technical solution of the foregoing information read/write method based on a blockchain.

Figure 7:
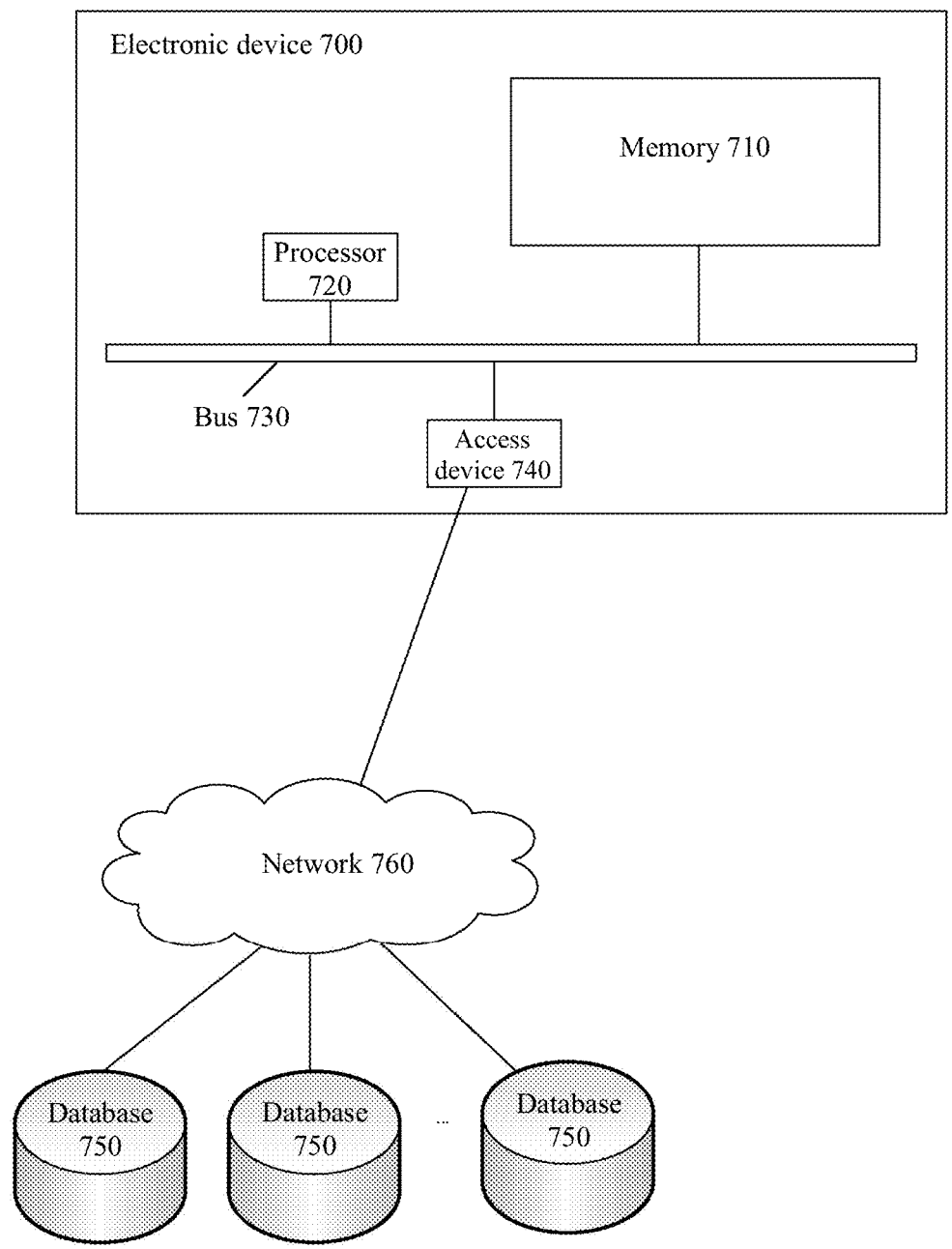
FIG. 7 is a structural block diagram of an electronic device according to one or more embodiments of this specification.

FIG. 7 is a structural block diagram of an electronic device 700 according to an embodiment of this specification. Components of the electronic device 700 include, but are not limited to, a memory 710 and a processor 720. The processor 720 is connected to the memory 710 through a bus 730, and a database 750 is configured to save data.

The electronic device 700 further includes an access device 740. The access device 740 enables the electronic device 700 to communicate through one or more networks 760. Examples of the networks include a public switched telephone network (PSTN), a local area network (LAN), a wide area network (WAN), a personal area network (PAN), or a combination of communications networks such as the Internet. The access device 740 may include one or more of any type of wired or wireless network interfaces (for example, a network interface card (NIC)), for example, an IEEE802.11 wireless local area network (WLAN) wireless interface, a Worldwide Interoperability for Microwave Access (Wi-Max) interface, an Ethernet interface, a Universal Serial Bus (USB) interface, a cellular network interface, a Bluetooth interface, a near-field communication (NFC) interface, and the like.

In some embodiments, the foregoing components of the electronic device 700 and other components not shown in FIG. 7 may also be connected to each other, for example, through a bus. It should be appreciated that, the structural block diagram of the electronic device shown in FIG. 7 is merely for an illustrative purpose, but does not limit the scope of this specification. A person skilled in the art may add or replace other components as required.

The electronic device 700 may be any type of stationary or mobile electronic device, including a mobile computer or a mobile electronic device (for example, a tablet computer, a personal digital assistant, a laptop computer, a notebook computer, and a netbook), a mobile phone (for example, a smart phone), a wearable electronic device (for example, a smart watch, and smart glasses) or other types of mobile devices, or a stationary electronic device such as a desktop computer or a PC. The electronic device 700 may alternatively be a mobile or stationary server.

The processor 720 is configured to execute the following computer executable instruction: receiving a service request from a project member, the service request comprising a to-be-processed service material of the project member; sending a service file in the to-be-processed service material to an object storage server and receiving a file storage identifier returned by the object storage server; and writing service information in the to-be-processed service material and the file storage identifier into the blockchain, and saving a hash value that is returned by the blockchain and that corresponds to write success information.

In some embodiments, before the step of sending a service file in the to-be-processed service material to an object storage server and receiving a file storage identifier returned by the object storage server, the computer executable instruction may further include: determining a type of a to-be-processed service according to the service request; and correspondingly, the sending a service file in the to-be-processed service material to an object storage server and receiving a file storage identifier returned by the object storage server may include: sending the service file to an object storage server corresponding to the type of the to-be-processed service, and receiving the file storage identifier returned by the object storage server.

In some embodiments, before the step of sending a service file in the to-be-processed service material to an object storage server and receiving a file storage identifier returned by the object storage server, the computer executable instruction may further include: creating a storage space in the object storage server; and receiving a storage key that is returned by the object server and that corresponds to the storage space.

In some embodiments, before the step of sending a service file in the to-be-processed service material to an object storage server and receiving a file storage identifier returned by the object storage server, the computer executable instruction may further include: sending the storage key to the object storage server for verification; and performing the step of sending a service file in the to-be-processed service material to an object storage server and receiving a file storage identifier returned by the object storage server, in a case that the verification succeeds.

In some embodiments, the sending a service file in the to-be-processed service material to an object storage server and receiving a file storage identifier returned by the object storage server may include: sending the service file to the created storage space in the object storage server, and receiving the file storage identifier returned by the object storage server.

In some embodiments, the sending a service file in the to-be-processed service material to an object storage server and receiving a file storage identifier returned by the object storage server may include: sending the service file to the storage space corresponding to the type of the to-be-processed service, and receiving the file storage identifier returned by the object storage server.

In some embodiments, after the step of receiving a service request from a project member, and before the step of sending a service file in the to-be-processed service material to an object storage server and receiving a file storage identifier returned by the object storage server, the computer executable instruction may further include: obtaining identification information of the project member; authenticating the project member according to the identification information; and performing the step of sending a service file in the to-be-processed service material to an object storage server and receiving a file storage identifier returned by the object storage server, in a case that the authentication of the project member succeeds.

In some embodiments, the writing service information in the to-be-processed service material and the file storage identifier into the blockchain, and saving a hash value that is returned by the blockchain and that corresponds to write success information may include: writing the service information and the file storage identifier into the blockchain according to a preset storage mode of the blockchain, and saving the hash value that is returned by the blockchain and that corresponds to the write success information.

In some embodiments, the writing service information in the to-be-processed service material and the file storage identifier into the blockchain, and saving a hash value that is returned by the blockchain and that corresponds to write success information may include: processing the service information to generate a service identifier; and writing the service identifier and the file storage identifier into the blockchain, and saving the hash value that is returned by the blockchain and that corresponds to the write success information.

In some embodiments, the writing service information in the to-be-processed service material and the file storage identifier into the blockchain, and saving a hash value that is returned by the blockchain and that corresponds to write success information may include: writing the service identifier and the file storage identifier into the blockchain according to the preset storage mode of the blockchain, and save the hash value that is returned by the blockchain and that corresponds to the write success information.

Figure 8:
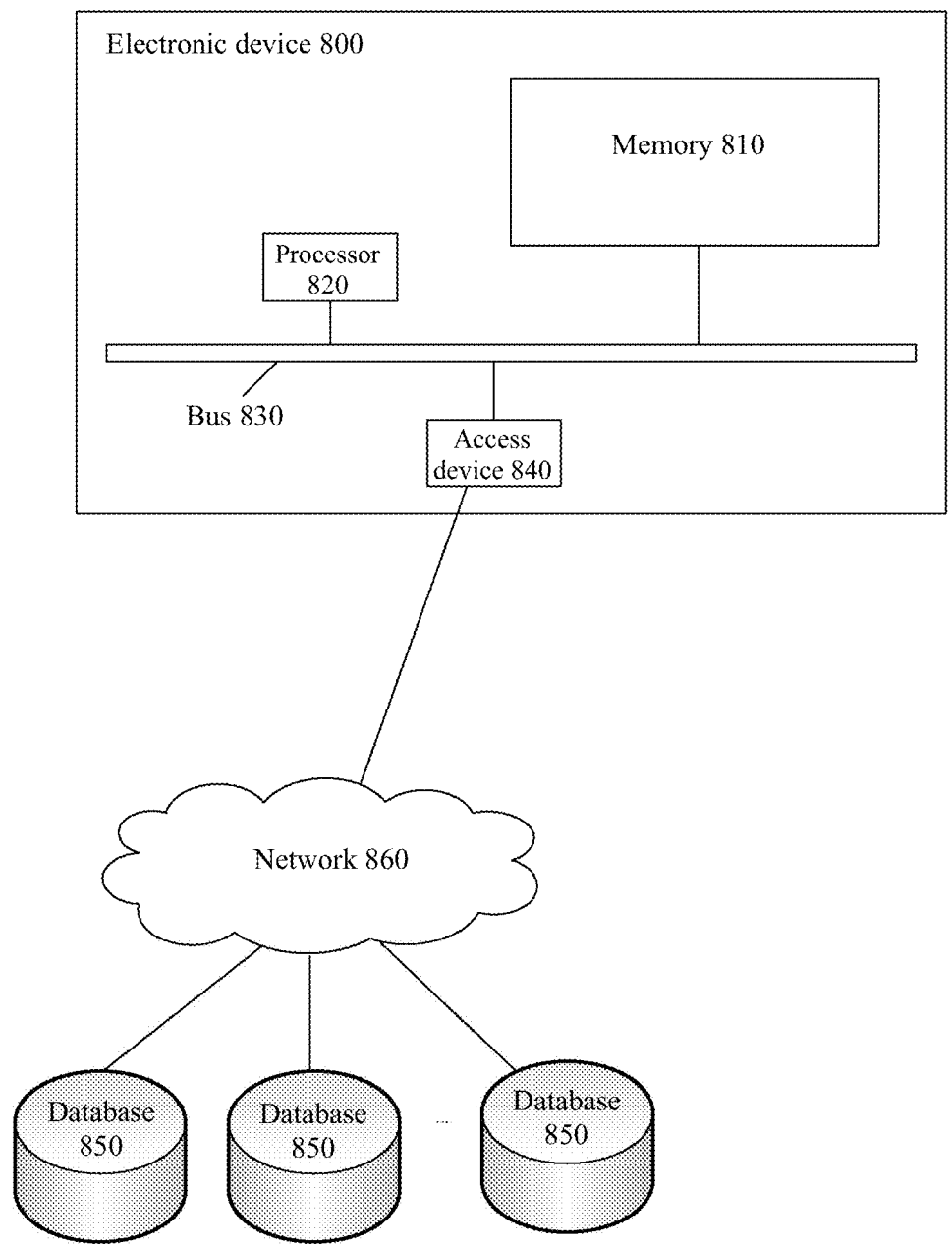
FIG. 8 is a structural block diagram of an electronic device according to one or more embodiments of this specification.

FIG. 8 is a structural block diagram of an electronic device 800 according to an embodiment of this specification. Components of the electronic device 800 include, but are not limited to, a memory 810 and a processor 820. The processor 820 is connected to the memory 810 through a bus 830. A database 850 is configured to save data. For the specific access manner and content, reference may be made to the electronic device 700, and details are not described again in this specification.

The processor 820 is further configured to execute the following computer executable instruction: receiving a hash value corresponding to a service request from a project member; querying, in the blockchain according to the hash value, service information and a file storage identifier that correspond to the service request; obtaining, in an object storage server according to the file storage identifier, a service file corresponding to the file storage identifier; and consolidating the service file with the service information, to determine to-be-processed service information of the project member.

In some embodiments, the querying, in the blockchain according to the hash value, service information and a file storage identifier that correspond to the service request includes: querying a service identifier and the file storage identifier in the blockchain according to the hash value; and determining, based on the service identifier, the service information corresponding to the service request.

In some embodiments, before the step of obtaining, in an object storage server according to the file storage identifier, a service file corresponding to the file storage identifier, the computer executable instruction further includes: querying a storage key of the object server in the blockchain according to the hash value; and sending, to the object server according to the storage key, an obtaining request for obtaining the service file in a storage space corresponding to the storage key.

In some embodiments, the obtaining, in an object storage server according to the file storage identifier, a service file corresponding to the file storage identifier includes: obtaining, according to the file storage identifier, the service file in the storage space that is in the object storage server and that corresponds to the storage key.

In some embodiments, the computer executable instruction further includes: determining whether the to-be-processed service information is in a service scope; if yes, matching a to-be-processed service of the project member with a project review group; and receiving a review result that is obtained after a project review group member in the project review group reviews the to-be-processed service.

Described above is a schematic solution of an electronic device in this embodiment. It should be noted that, the technical solution of the electronic device belongs to the same conception as the technical solution of the foregoing information read/write method based on a blockchain. For content not described in detail in the technical solution of the electronic device, reference may be made to the description of the technical solution of the foregoing information read/write method based on a blockchain.

An embodiment of the present specification further provides a computer readable storage medium, which stores a computer instruction. When executed by a processor, the instruction implements steps of the foregoing information read/write method based on a blockchain.

Described above is a schematic solution of a computer readable storage medium in this embodiment. It should be noted that, the technical solution of the storage medium belongs to the same conception as the technical solution of the foregoing information read/write method based on a blockchain. For content not described in detail in the technical solution of the storage medium, reference may be made to the description of the technical solution of the foregoing information read/write method based on a blockchain.

Specific embodiments of this specification are described above. Other embodiments are in the scope of the appended claims. In some cases, the actions or steps described in the claims may be performed in a sequence different from the sequence in the embodiment, and may still achieve the expected result. In addition, the process described in the drawings does not necessarily require the illustrated specific sequence or a successive sequence to achieve the expected result. In some implementations, multi-task processing and parallel processing are feasible or may be beneficial.

The computer instructions include computer program code, and the computer program code may be in a source code form, an object code form, an executable file, or some intermediate forms. The computer-readable medium may include: any entity or device capable of comprising the computer program code, a recording medium, a USB flash drive, a removable hard disk, a magnetic disk, an optical disc, a computer memory, a read-only memory (ROM), a random-access memory (RAM), electric carrier signals, telecommunication signals, software distribution media, and the like. It should be noted that, the content contained in the computer-readable medium may be appropriately added or reduced according to the requirements of legislation and patent practice in the jurisdictions. For example, in some jurisdictions, the computer-readable medium does not include electric carrier signals and telecommunication signals.

It should be noted that, for brief description, the foregoing method embodiments are represented as a series of actions. However, persons skilled in the art should appreciate that the present specification is not limited to the described order of the actions, because according to the present specification, some steps may be performed in other orders or simultaneously. It should be further appreciated by persons skilled in the art that the embodiments described in the present specification all belong to preferred embodiments, and the actions and modules are not necessarily required by the present specification.

In the foregoing embodiments, the description of each embodiment has respective focuses. For a part that is not described in detail in an embodiment, reference may be made to related descriptions in other embodiments.

The preferred embodiments of the present specification disclosed above are only used to help explain the present specification. The optional embodiments do not describe all the details, and are not intended to limit the present specification to the specific implementations described. Obviously, many modifications and changes may be made according to the content of this specification. These embodiments are selected and described in this specification for better explaining the principles and practical applications of the present specification, so that those skilled in the art may better understand and use the present specification. The present specification is limited only by the claims and full scope and equivalents thereof.

What is claimed is:

1. A computer-implemented method, comprising:
   creating a storage space in an object storage server for storing files of a project;
   receiving from the object storage server a storage key corresponding to the created storage space;
   receiving a service request from a project member of the project, wherein the service request comprises a service file of the project member and file information of the service file;
   sending the storage key to the object storage server for permission verification;
   upon determining that the permission verification succeeded, sending the service file to the object storage server for storage;
   receiving a file storage identifier returned by the object storage server, wherein the file storage identifier corresponds to the service file stored at the object storage server;
   generating a service identifier by compressing the file information of the service file;
   storing the service identifier and the file storage identifier into a blockchain; and
   obtaining a hash value that is returned from the blockchain and that corresponds to successfully writing the service identifier and the file storage identifier into the blockchain.

2. The method of claim 1, wherein the creating the storage space in the object storage server comprises:
   sending a request to the object storage server to create the storage space.

3. The method of claim 1, wherein the service file comprises at least one of an image file, a video file, or a scanned file.

4. The method of claim 1, wherein storing the service identifier and the file storage identifier into the blockchain further comprises:
   writing the service identifier and the file storage identifier into the blockchain.

5. The method of claim 4, further comprising:
   retrieving the file storage identifier and the storage key from the blockchain based on the hash value;
   sending the storage key to the object storage server for obtaining permission; and
   upon obtaining the permission, extracting the service file based on the file storage identifier from the object storage server.

6. The method of claim 5, further comprising:
   retrieving the service identifier based on the hash value from the blockchain; and
   decompressing the service identifier to obtain the file information of the service file.

7. The method of claim 6, further comprising:
   integrating the service file and the file information of the service file to determine service information of the project member.

8. A system for information read/write based on a blockchain, comprising one or more processors and one or more non-transitory computer-readable memories coupled to the one or more processors and configured with instructions executable by the one or more processors to cause the system to perform operations comprising:
   creating a storage space in an object storage server for storing files of a project;
   receiving from the object storage server a storage key corresponding to the created storage space;
   receiving a service request from a project member of the project, wherein the service request comprises a service file of the project member and file information of the service file;
   sending the storage key to the object storage server for permission verification;
   upon determining that the permission verification succeeded, sending the service file to the object storage server for storage;
   receiving a file storage identifier returned by the object storage server, wherein the file storage identifier corresponds to the service file stored at the object storage server;
   generating a service identifier by compressing the file information of the service file;
   storing the service identifier and the file storage identifier into a blockchain; and
   obtaining a hash value that is returned from the blockchain and that corresponds to successfully writing the service identifier and the file storage identifier into the blockchain.

9. The system according to claim 8, wherein the creating the storage space in the object storage server comprises:
   sending a request to the object storage server to create the storage space.

10. The system according to claim 8, wherein storing the service identifier and the file storage identifier into the blockchain further comprises:
    writing the service identifier and the file storage identifier into the blockchain.

11. The system according to claim 10, wherein the operations further comprise:
    retrieving the file storage identifier and the storage key from the blockchain based on the hash value;
    sending the storage key to the object storage server for obtaining permission; and
    upon obtaining the permission, extracting the service file based on the file storage identifier from the object storage server.

12. The system according to claim 11, wherein the operations further comprise:
retrieving the service identifier based on the hash value from the blockchain; and
decompressing the service identifier to obtain the file information of the service file.

13. The system according to claim 12, wherein the operations further comprise:
integrating the service file and the file information of the service file to determine service information of the project member.

14. A non-transitory computer-readable storage medium for information read/write based on a blockchain, configured with instructions executable by one or more processors to cause the one or more processors to perform operations comprising:
creating a storage space in an object storage server for storing files of a project;
receiving from the object storage server a storage key corresponding to the created storage space;
receiving a service request from a project member of the project, wherein the service request comprises a service file of the project member and file information of the service file;
sending the storage key to the object storage server for permission verification;
upon determining that the permission verification succeeded, sending the service file to the object storage server for storage;
receiving a file storage identifier returned by the object storage server, wherein the file storage identifier corresponds to the service file stored at the object storage server;
generating a service identifier by compressing the file information of the service file;
storing the service identifier and the file storage identifier into a blockchain; and
obtaining a hash value that is returned from the blockchain and that corresponds to successfully writing the service identifier and the file storage identifier into the blockchain.

15. The storage medium according to claim 14, wherein the creating the storage space in the object storage server comprises:
sending a request to the object storage server to create the storage space.

16. The storage medium according to claim 14, wherein storing the service identifier and the file storage identifier into the blockchain further comprises:
writing the service identifier and the file storage identifier into the blockchain.

17. The storage medium according to claim 16, wherein the operations further comprise:
retrieving the file storage identifier and the storage key from the blockchain based on the hash value;
sending the storage key to the object storage server for obtaining permission; and
upon obtaining the permission, extracting the service file based on the file storage identifier from the object storage server.

18. The storage medium according to claim 17, wherein the operations further comprise:
retrieving the service identifier based on the hash value from the blockchain; and
decompressing the service identifier to obtain the file information of the service file.

19. The storage medium according to claim 18, wherein the operations further comprise:
integrating the service file and the file information of the service file to determine service information of the project member.

* * * * *